US008983233B2

(12) United States Patent
Katz et al.

(10) Patent No.: US 8,983,233 B2
(45) Date of Patent: *Mar. 17, 2015

(54) TIME-OF-FLIGHT DEPTH IMAGING

(71) Applicant: Microsoft Corporation, Redmond, WA (US)

(72) Inventors: Sagi Katz, Yokneam Ilit (IL); Avishai Adler, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/015,887

(22) Filed: Aug. 30, 2013

(65) Prior Publication Data

US 2014/0002611 A1 Jan. 2, 2014

Related U.S. Application Data

(63) Continuation of application No. 12/897,145, filed on Oct. 4, 2010, now Pat. No. 8,548,270.

(51) Int. Cl.
*G06K 9/36* (2006.01)
*G06K 9/00* (2006.01)
(Continued)

(52) U.S. Cl.
CPC ............ *G06T 7/0075* (2013.01); *G01S 17/107* (2013.01); *G01S 17/32* (2013.01); *G01S 17/50* (2013.01); *G01S 17/89* (2013.01)
USPC .............................. 382/286; 382/154; 348/46

(58) Field of Classification Search
USPC ................. 382/106, 154, 260, 264, 285, 286; 348/46
See application file for complete search history.

(56) References Cited

U.S. PATENT DOCUMENTS 4,627,620 A 12/1986 Yang
4,630,910 A 12/1986 Ross et al.
(Continued)

FOREIGN PATENT DOCUMENTS

CN 1196545 A 10/1998
CN 101556696 A 10/2009
(Continued)

OTHER PUBLICATIONS

Chan, et al., "A Noise-Aware Filter for Real-Time Depth Upsampling", Workshop on Multi-camera and Multi-modal Sensor Fusion Algorithms and Applications, The 10th European Conference on Computer Vision (ECCC 2008), Oct. 12-18, 2008, pp. 1-12, Marseille, France.
(Continued)

*Primary Examiner* — Yon Couso
(74) *Attorney, Agent, or Firm* — Miia Sula; Judy Yee; Micky Minhas

(57) ABSTRACT

Techniques are provided for determining depth to objects. A depth image may be determined based on two light intensity images. This technique may compensate for differences in reflectivity of objects in the field of view. However, there may be some misalignment between pixels in the two light intensity images. An iterative process may be used to relax a requirement for an exact match between the light intensity images. The iterative process may involve modifying one of the light intensity images based on a smoothed version of a depth image that is generated from the two light intensity images. Then, new values may be determined for the depth image based on the modified image and the other light intensity image. Thus, pixel misalignment between the two light intensity images may be compensated.

20 Claims, 14 Drawing Sheets

(51) Int. Cl.
*G06T 7/00* (2006.01)
*G01S 17/10* (2006.01)
*G01S 17/32* (2006.01)
*G01S 17/50* (2006.01)
*G01S 17/89* (2006.01)

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,193,124 A | 3/1993 | Subbarao |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,764,871 A | 6/1998 | Fogel |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,409,598 B1 | 6/2002 | Takeuchi |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,031,512 B2 | 4/2006 | Ng |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |

(56) References Cited

U.S. PATENT DOCUMENTS

| | | |
|---|---|---|
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,747,067 B2 | 6/2010 | Popescu et al. |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,111,908 B2 | 2/2012 | Sim et al. |
| 2007/0018977 A1 | 1/2007 | Niem et al. |
| 2008/0026838 A1 | 1/2008 | Dunstan et al. |
| 2009/0190007 A1 | 7/2009 | Oggier et al. |
| 2009/0290758 A1 | 11/2009 | Ng-Thow-Hing et al. |
| 2010/0020209 A1 | 1/2010 | Kim |
| 2012/0082346 A1 | 4/2012 | Katz et al. |

FOREIGN PATENT DOCUMENTS

| | | |
|---|---|---|
| CN | 101254344 B | 6/2010 |
| EP | 0583061 A2 | 2/1994 |
| JP | 08044490 A1 | 2/1996 |
| JP | 2001-209822 A | 8/2001 |
| WO | 93/10708 A1 | 6/1993 |
| WO | 97/17598 A1 | 5/1997 |
| WO | 99/44698 A1 | 9/1999 |

OTHER PUBLICATIONS

Gokturk, S. Burak, Hakan Yalcin, and Cyrus Bamji, "A Time-Of-Flight Depth Sensor—System Description, Issues and Solutions", Proceedings of the 2004 Conference on Computer Vision and Pattern Recognition, Jun. 27-Jul. 2, 2004, pp. 1-9, IEEE Computer Society, Washington, DC, USA.

Kim, et al., "Design and Calibration of a Multi-view TOF Sensor Fusion System," Proceedings of the Institute of Electrical and Electronics Engineers Conference on Computer Vision and Pattern Recognition, Jun. 24-28, 2008, pp. 1-7, Anchorage, AK, USA.

Schuon, et al., "High-Quality Scanning Using Time-Of-Flight Depth Superresolution", Workshop on Time-Of-Flight Camera Based Computer Vision, Institute of Electrical and Electronics Engineers Conference on Computer Vision and Pattern Recognition, Jun. 24-28, 2008, pp. 1-7, Anchorage, AK, USA.

Wu, et al., "Improved 3D depth image estimation algorithm for visual camera," Proceedings of the Second International Congress on Image and Signal Processing (CISP 2009), Oct. 17-19, 2009, pp. 1-4, Tianjin, China.

Zhu, et al., "Fusion of Time-of-Flight Depth and Stereo for High Accuracy Depth Maps," Proceedings of the Institute of Electrical and Electronics Engineers Conference on Computer Vision and Pattern Recognition, Jun. 24-28, 2008, pp. 1-7, Anchorage, AK, USA.

Canesta 101 Introduction to 3D Vision in CMOS, Canesta, Mar. 2008.

Lucas et al., "An Iterative Image Registration Technique with an Application to Stereo Vision," Proceedings of Imaging Understanding Workshop, pp. 121-130 (1981).

Toyama, Kentaro, et al., "Probabilistic Tracking in a Metric Space," Eighth International Conference on Computer Vision, Vancouver, Canada, vol. 2, Jul. 2001, 8 pages.

Office Action dated Feb. 28, 2013, U.S. Appl. No. 12/897,145, filed Oct. 4, 2010, 37 pages.

Response to Office Action dated May 15, 2013, U.S. Appl. No. 12/897,145, filed Oct. 4, 2010, 13 pages.

Notice of Allowance and Fee(s) Due dated May 30, 2013, U.S. Appl. No. 12/897,145, filed Oct. 4, 2010, 6 pages.

Chinese Office Action dated Jan. 15, 2014, Chinese Patent Application No. 201110315789.6, filed Oct. 8, 2011, 6 pages.

Partial English language translation of Chinese Office Action dated Jan. 15, 2014, Chinese Patent Application No. 201110315789.6, filed Oct. 8, 2011, 5 pages.

English language translation of Abstract of foreign patent document JP 2001-209822, published Aug. 3, 2001, applicant Square Co Ltd, 2 pages.

English language translation of Abstract of foreign patent document CN 101556696, published Oct. 14, 2009, applicant Univ Zhejiang, 2 pages.

English language translation of Abstract of foreign patent document CN 1196545 published Oct. 21, 1998 applicant Eastman Kodak Co, 1 page.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

(56) References Cited

OTHER PUBLICATIONS

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

Response to Office Action dated May 30, 2014, Chinese Patent Application No. 2011103157896.

English translation of Amendments filed in Response to Office Action dated May 30, 2014, Chinese Patent Application No. 2011103157896.

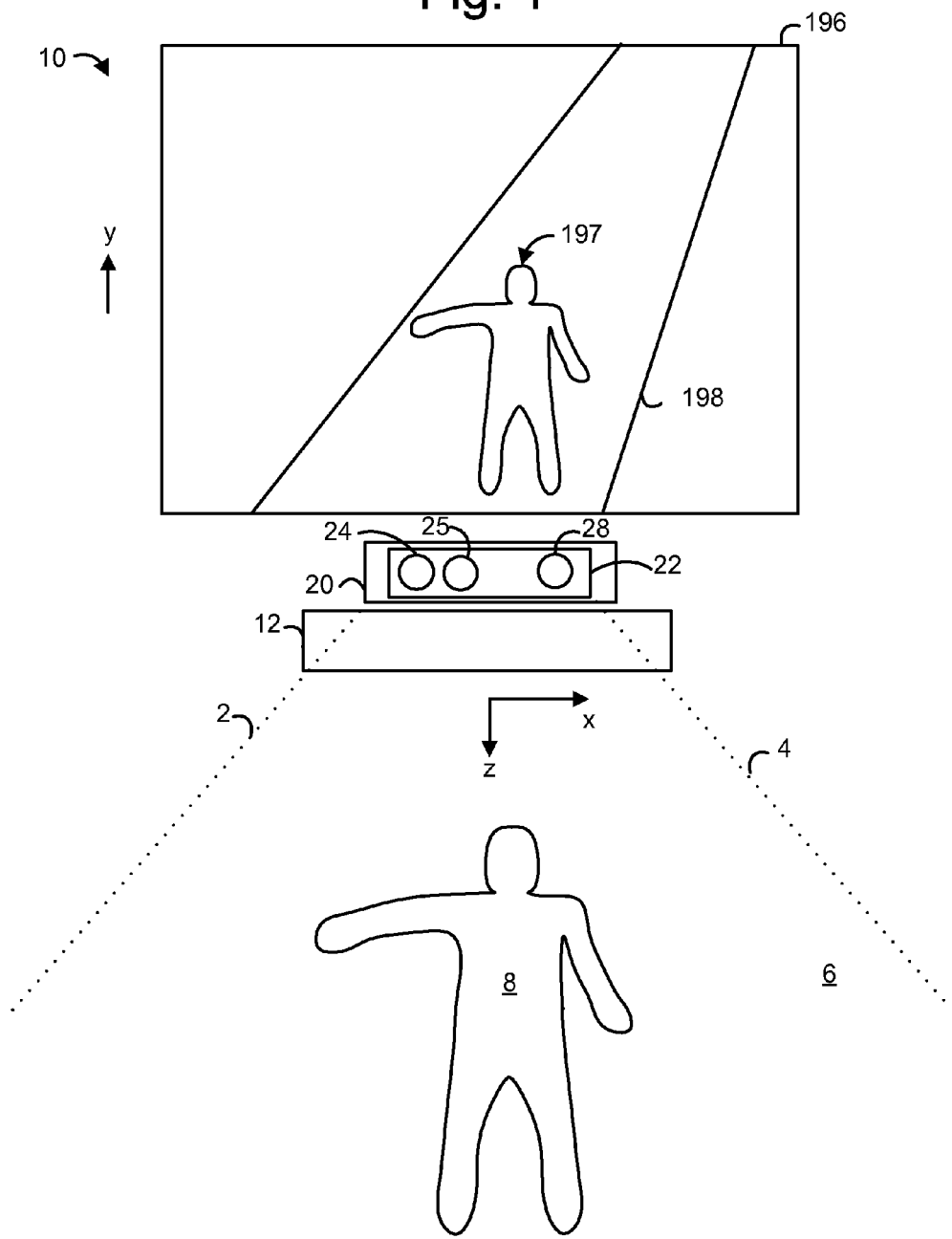

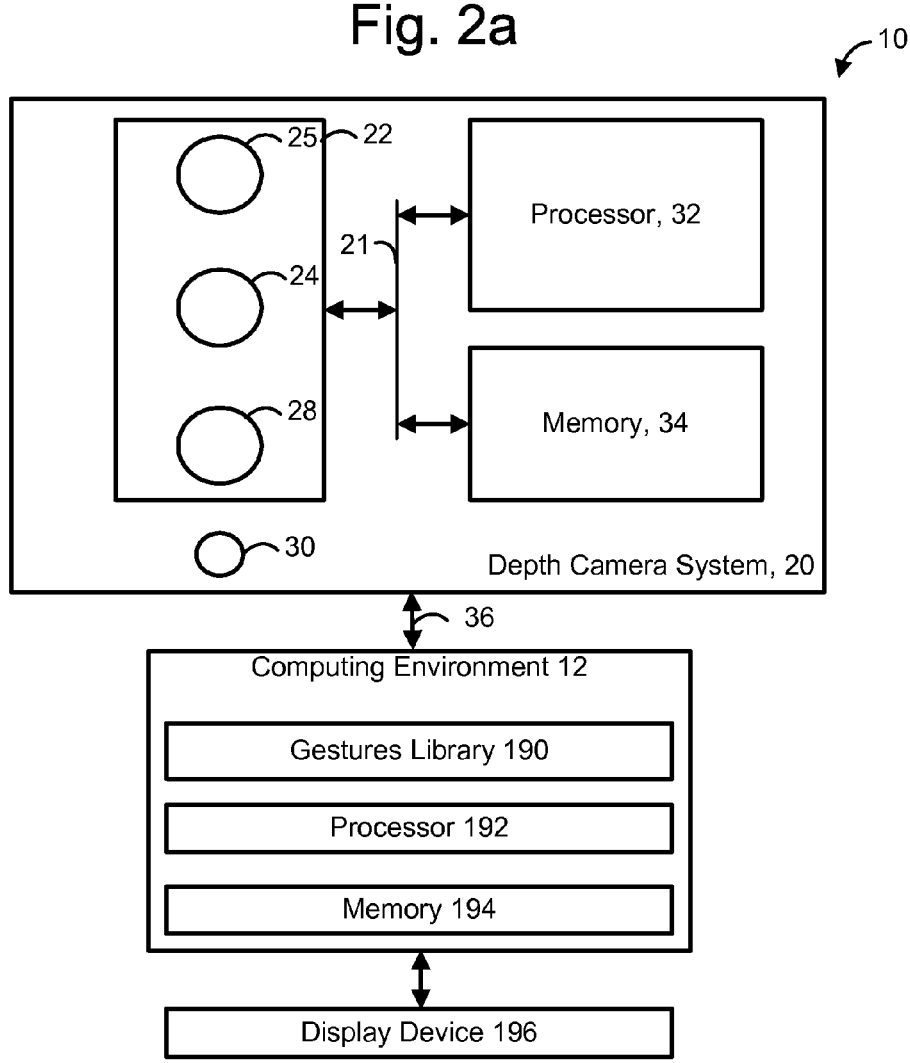
Fig. 2a
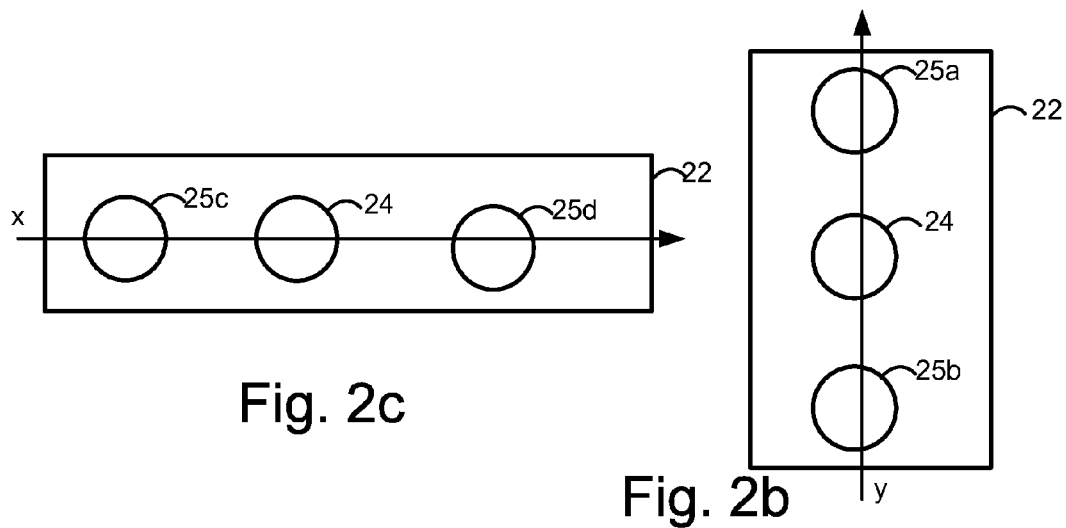
Fig. 2c
Fig. 2b

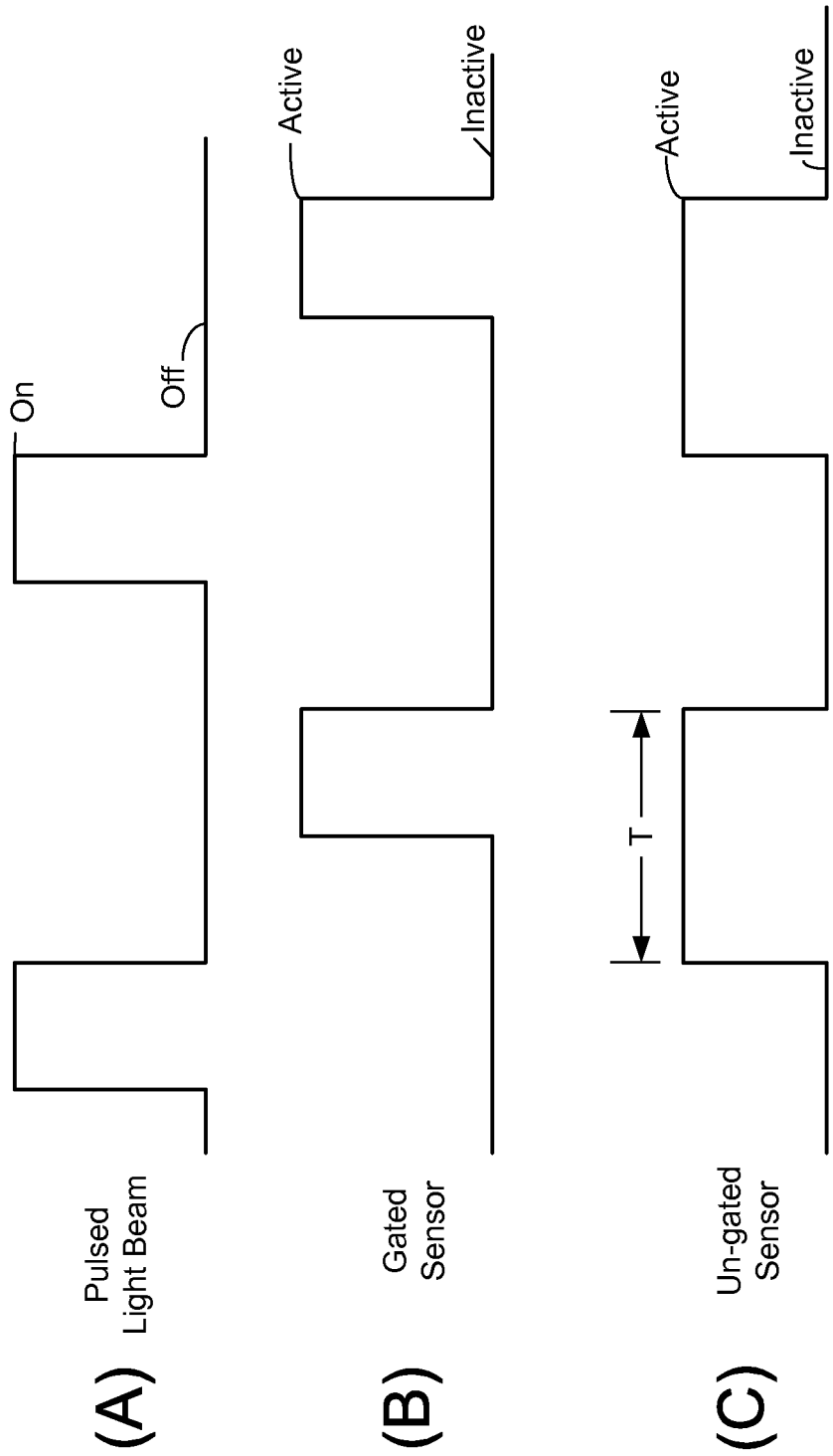

TIME-OF-FLIGHT DEPTH IMAGING

PRIORITY

This application is a continuing application of U.S. patent application Ser. No. 12/897,145, entitled "Time-Of-Flight Depth Imaging," by Katz et al., filed on Oct. 4, 2010, published as US 2012-0082346 on Apr. 5, 2012 and issued as U.S. Pat. No. 8,548,270 on Oct. 1, 2013, which is incorporated herein by reference in its entirety.

BACKGROUND

A depth camera system obtains data regarding the location of a human or other object in a physical space. The camera may have one or more sensors that have pixels that collect light intensity. Depth values may be determined from the light intensity. For example, the light intensity data from two sensors may be correlated and a depth value may be determined for each pixel. The depth values may be input to an application in a computing system for a wide variety of applications. Many applications are possible, such as for military, entertainment, sports and medical purposes. For instance, depth values regarding a human can be mapped to a three-dimensional (3-D) human skeletal model and used to create an animated character or avatar.

To determine depth values, the depth camera may project light onto an object in the camera's field of view. The light reflects off the object and back to one or more image sensors in the camera, which collect light intensity. The sensors may be for example, CCD or CMOS sensors. The sensors may comprise a pixel array, such that each pixel integrates light intensity over time, based on how many photons reach the pixel. The light intensity at the pixels may be processed to determine the depth values. One technique for determining distance to the object is based on the round trip time-of-flight of the light.

However, differences in reflectance of objects may lead to problems. For example, two objects at the same distance but with different reflectivity will result in different light intensity readings at the sensor. In order to combat this problem, and others, some techniques perform two different depth measurements and combine the results. The two different depth measurements might use the same sensor, but be taken at different times. Therefore, there might be object (or camera) motion between the time the measurements were captured by the sensor. Alternatively, using two sensors allows the depth measurements to be taken at the same time. However, the two sensors need to be located in different physical locations, which could lead to parallax differences. The data collected from the two measurements needs to be correlated (or matched) to create a single depth image. However, the aforementioned differences in the two depth measurements can make correlating the depth measurements difficult or lead to inaccuracies.

Additionally, depth cameras may suffer from noisy depth measurements. For example, there may be some background light that might be collected along with the light reflected off objects. Noise can result in many other ways.

Therefore, further refinements are needed which allow a more accurate determination of the depth of objects within a field of view of a depth camera. The techniques should be compatible with existing depth detection cameras.

SUMMARY

Techniques are provided for determining depth or distance to objects within a field of view of an electronic device. A depth image may be determined based on two light intensity images that are collected at different places or times. Generating a depth image based on two light intensity images may compensate for differences in reflectivity of objects in the field of view. An iterative process may be used to relax a requirement for an exact match between the light intensity images. Thus, pixel misalignment between the two light intensity images may be compensated for. Also, the iterative process may compensate for noise in the light intensity images. Therefore, a high quality depth image (e.g., final depth values) may be generated using light intensity information from multiple sensors, or from the same sensor at different times.

One embodiment includes a method of determining a depth image which includes the following. A depth image is calculated based on a first light intensity image and a second light intensity image. The first and second light intensity images contain pixel values for the same scene. The depth image is smoothed, and the first light intensity image is modified based on the smoothed output depth image and the second light intensity image. New values are calculated for the depth image based on the modified first light intensity image and the second light intensity image. Smoothing the depth image, modifying the first light intensity image (within pre-defined boundaries), and calculating new values for the depth image are repeated until it is determined that processing the depth image is complete. At this point, pixels in the two light intensity images are aligned and the refined depth image is complete.

One embodiment includes an apparatus comprising a processor and a computer readable storage medium coupled to the processor. The computer readable storage medium has instructions stored thereon which, when executed on the processor cause the processor to perform the following. The processor accesses a first light intensity image and a second light intensity image that contain pixel values for the same scene. The processor determines boundary values for pixels in the first light intensity image based on one or more neighbor pixels in the first light intensity image. The processor calculates a depth image based on the first light intensity image and the second light intensity image and smoothes the depth image. The processor determines whether to modify the first light intensity image based on results of smoothing the depth image. Upon determining that the first light intensity image should be modified, the processor modifies the first light intensity image based on the smoothed depth image and the second light intensity image. Modifying may include keeping values for the pixels in the first light intensity image within the boundary values. Also, the processor calculates new values for the depth image based on the modified first light intensity image and the second light intensity image if the first light intensity image was modified. The processor continues to modify the first light intensity image and calculate new values for the depth image until it is determined not to modify the first light intensity image. At this point, the two intensity images are aligned and the smoothed depth image extraction is complete.

One embodiment includes a method of determining a depth image, comprising the following. A first light intensity image and a second light intensity image that have pixels with light intensity values for the same field of view are accessed. Boundary values are determined for pixels in the first light intensity image based on a possible pixel misalignment between the first light intensity image and the second light intensity image. A depth image is determined based on the first light intensity image and the second light intensity image. The depth image may be smoothed and a determination is made whether to modify the first light intensity image based on results of smoothing the depth image. The first light intensity image may be modified based on the smoothed depth image and the second light intensity image, which may include performing an inverse of calculating the depth image. Also, modifying the first light intensity image includes keeping pixel values in the first light intensity image within the boundary values. New values for the depth image are calculated based on the modified first light intensity image and the second light intensity image. The smoothing, modifying the first light intensity image, and calculating new values for the depth image are repeated until it is determined not to modify the first light intensity image.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 1 depicts an example embodiment of a motion capture system.

FIG. 2A depicts an example block diagram of the motion capture system of FIG. 1.

FIG. 2B depicts one possible configuration of the image camera component depicted in FIG. 2A.

FIG. 2C depicts another possible configuration of the image camera component depicted in FIG. 2A.

FIGS. 6A, 6B and 6C depict one example of timing of a light pulse, and activation of a gated sensor and an un-gated sensor.

DETAILED DESCRIPTION

Figure 3:
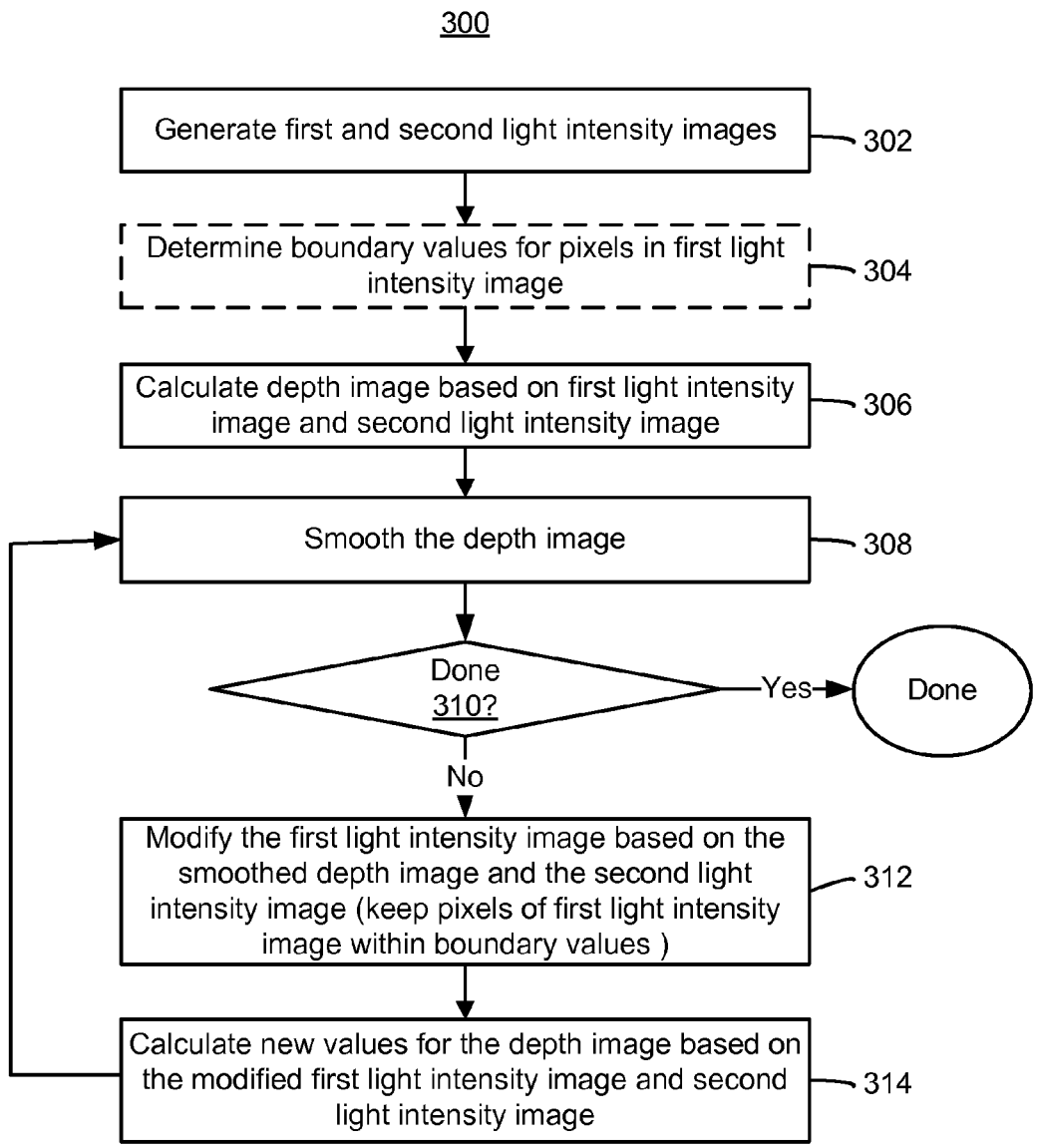
FIG. 3 is a flowchart of one embodiment of a process of determining a depth image.

Techniques are provided for determining depth to objects. A depth image may be determined based on two light intensity images that are collected at different places or times. For example, a light beam may be transmitted into a field of view with two image sensors at slightly different locations being used to collect two input light intensity images. As an alternative, the light intensity images might be collected from the same sensor but at different times. A depth image may be generated based on the two light intensity images. This technique may compensate for differences in reflectivity of objects in the field of view. However, there may be some misalignment between pixels in the two light intensity images. An iterative process may be used to relax a requirement for an exact match between the light intensity images. The iterative process may involve modifying one of the light intensity images based on a smoothed version of a depth image that is generated from the two light intensity images. Then, new values may be determined for the depth image based on the modified light intensity image and the other light intensity image. In some embodiments, boundary values are determined for pixels in the light intensity image that is to be modified based on possible pixel misalignment between the two light intensity images. The pixels in the light intensity image that gets modified may be kept within their respective boundary values during processing. The iterative process may compensate for pixel misalignment between the two light intensity images. Stated another way, the iterative process may relax a requirement for tight pixel alignment between the two input light intensity images. Moreover, the iterative process may compensate for noise in the light intensity images. Therefore, a high quality depth image may be generated using depth information from multiple sensors, or from the same sensor at different times.

In some embodiments, determining a depth image is used in a motion capture system. Therefore, an example motion capture system will be described. However, it will be understood that technology described herein is not limited to a motion capture system. FIG. 1 depicts an example of a motion capture system 10 in which a person interacts with an application. The motion capture system 10 includes a display 196, a depth camera system 20, and a computing environment or apparatus 12. The depth camera system 20 may include an image camera component 22 having a light transmitter 24, light receiver 25, and a red-green-blue (RGB) camera 28. In one embodiment, the light transmitter 24 emits a collimated light beam. Examples of collimated light include, but are not limited to, Infrared (IR) and laser. In one embodiment, the light transmitter 24 is an LED. Light that reflects off from an object 8 in the field of view is detected by the light receiver 25.

A user, also referred to as a person or player, stands in a field of view 6 of the depth camera system 20. Lines 2 and 4 denote a boundary of the field of view 6. In this example, the depth camera system 20, and computing environment 12 provide an application in which an avatar 197 on the display 196 track the movements of the object 8 (e.g., a user) For example, the avatar 197 may raise an arm when the user raises an arm. The avatar 197 is standing on a road 198 in a 3-D virtual world. A Cartesian world coordinate system may be defined which includes a z-axis which extends along the focal length of the depth camera system 20, e.g., horizontally, a y-axis which extends vertically, and an x-axis which extends laterally and horizontally. Note that the perspective of the drawing is modified as a simplification, as the display 196 extends vertically in the y-axis direction and the z-axis extends out from the depth camera system 20, perpendicular to the y-axis and the x-axis, and parallel to a ground surface on which the user stands.

Generally, the motion capture system 10 is used to recognize, analyze, and/or track an object. The computing environment 12 can include a computer, a gaming system or console, or the like, as well as hardware components and/or software components to execute applications.

The depth camera system 20 may include a camera which is used to visually monitor one or more objects 8, such as the user, such that gestures and/or movements performed by the user may be captured, analyzed, and tracked to perform one or more controls or actions within an application, such as animating an avatar or on-screen character or selecting a menu item in a user interface (UI).

The motion capture system 10 may be connected to an audiovisual device such as the display 196, e.g., a television, a monitor, a high-definition television (HDTV), or the like, or even a projection on a wall or other surface, that provides a visual and audio output to the user. An audio output can also be provided via a separate device. To drive the display, the computing environment 12 may include a video adapter such as a graphics card and/or an audio adapter such as a sound card that provides audiovisual signals associated with an application. The display 196 may be connected to the computing environment 12 via, for example, an S-Video cable, a coaxial cable, an HDMI cable, a DVI cable, a VGA cable, or the like.

The object 8 may be tracked using the depth camera system 20 such that the gestures and/or movements of the user are captured and used to animate an avatar or on-screen character and/or interpreted as input controls to the application being executed by computer environment 12.

Some movements of the object 8 may be interpreted as controls that may correspond to actions other than controlling an avatar. For example, in one embodiment, the player may use movements to end, pause, or save a game, select a level, view high scores, communicate with a friend, and so forth. The player may use movements to select the game or other application from a main user interface, or to otherwise navigate a menu of options. Thus, a full range of motion of the object 8 may be available, used, and analyzed in any suitable manner to interact with an application.

The person can hold an object such as a prop when interacting with an application. In such embodiments, the movement of the person and the object may be used to control an application. For example, the motion of a player holding a racket may be tracked and used for controlling an on-screen racket in an application which simulates a tennis game. In another example embodiment, the motion of a player holding a toy weapon such as a plastic sword may be tracked and used for controlling a corresponding weapon in the virtual world of an application which provides a pirate ship.

The motion capture system 10 may further be used to interpret target movements as operating system and/or application controls that are outside the realm of games and other applications which are meant for entertainment and leisure. For example, virtually any controllable aspect of an operating system and/or application may be controlled by movements of the object 8.

FIG. 2A depicts an example block diagram of the motion capture system 10 of FIG. 1. The depth camera system 20 may be configured to capture video with depth information including a depth image that may include depth values. Technique for determining the depth image are described herein. The depth camera system 20 may organize the depth information into "Z layers," or layers that may be perpendicular to a Z-axis extending from the depth camera system 20 along its line of sight.

The depth camera system 20 may include an image camera component 22, such as a depth camera that captures the depth image of a scene in a physical space. The depth image may include a two-dimensional (2-D) pixel area of the captured scene, where each pixel in the 2-D pixel area has an associated depth value which represents either a linear distance from the image camera component 22 (radial distance) or the Z component of the 3D location viewed by the pixel (perpendicular distance).

The image camera component 22 may include a light transmitter 24 and one or more light sensors 25 to capture depth information. For example, depth camera system 20 may use the light transmitter 24 to emit light onto the physical space and use light sensor 25 to detect the reflected light from the surface of one or more objects in the physical space.

In some embodiments, the light transmitter 24 transmits pulsed infrared light. The light pulses reflect off from objects in the field of view and are collected at sensors, which may integrate the photons over time. For example, each pixel contains a light intensity value based on how many photons reach that pixel over a collection period. Depth values may be determined based on the light intensity. Such techniques are sometimes referred to as "time-of-flight" measurements as there may be a relationship between the light intensity at a pixel and the round trip time of flight of the light.

In some embodiments, the transmitted light is modulated at desired frequency. The modulated light reflects off from objects in the field of view and is collected at one or more sensors, which may integrate the photons over time. In one embodiment, one sensor collects light when the transmitted light (at the source) has a first phase (or range of phases) and a second sensor collects light when the transmitted light has a second phase (or second range of phases). This technique may also be referred to as a "time-of-flight" measurement as there may be a relationship between the light intensity at a pixel and the round trip time of flight of the light.

The depth camera system 20 may capture two or more light intensity images of the same scene and process them to generate a single depth image. In one embodiment, two light intensity images are captured at the same time, but with two different sensors. FIG. 2B depicts one possible configuration of the image camera component 22 in which the light transmitter 24 is centered between two light sensors 25a, 25b. In this example, one light sensor 25a is above the light source 24 and the other light sensor 25b is below the light source 24. Other configurations could be used. For example, one light sensor 25c may be to the left of the light source 24 and the other light sensor 25d may be to the right of the light source 24, as depicted in FIG. 2C. In FIG. 2B, the sensors 25a, 25b are aligned along the y-axis. In FIG. 2C, the sensors 25c, 25d are aligned along the x-axis. In some embodiments, the image camera component 22 can be tilted by the use of a motor or the like. Therefore, it will be appreciated that the orientation of the sensors 25 is not required to be along either an x- or y-axis. Information about the physical configuration of the light sensors 25 relative to the light transmitter 24 may be used when processing the two captured light intensity images to generate the final single depth image. In some embodiments, the two light intensity images are captured with the same light sensor 25, but at different times.

The red-green-blue (RGB) camera 28 may be used to capture a visible light image. The depth camera system 20 may further include a microphone 30 which includes, e.g., a transducer or sensor that receives and converts sound waves into an electrical signal. Additionally, the microphone 30 may be used to receive audio signals such as sounds that are provided by a person to control an application that is run by the computing environment 12. The audio signals can include vocal sounds of the person such as spoken words, whistling, shouts and other utterances as well as non-vocal sounds such as clapping hands or stomping feet. In some embodiments, the microphone 30 is a microphone array, which may have any number of microphones running together.

The depth camera system 20 may include a processor 32 that is in communication with the image camera component 22. The processor 32 may include a standardized processor, a specialized processor, a microprocessor, or the like that may execute instructions including, for example, instructions for receiving a depth image and de-aliasing the depth image.

The depth camera system 20 may further include a memory component 34 that may store instructions that are executed by the processor 32, as well as storing images or frames of images captured by the RGB camera, or any other suitable information, images, or the like. According to an example embodiment, the memory component 34 may include random access memory (RAM), read only memory (ROM), cache, flash memory, a hard disk, or any other suitable tangible computer readable storage component. The memory component 34 may be a separate component in communication with the image capture component 22 and the processor 32 via a bus 21. According to another embodiment, the memory component 34 may be integrated into the processor 32 and/or the image capture component 22.

The depth camera system 20 may be in communication with the computing environment 12 via a communication link 36. The communication link 36 may be a wired and/or a wireless connection. According to one embodiment, the computing environment 12 may provide a clock signal to the depth camera system 20 via the communication link 36 that indicates when to capture image data from the physical space which is in the field of view of the depth camera system 20.

Additionally, the depth camera system 20 may provide the depth information and images captured by the RGB camera 28 to the computing environment 12 via the communication link 36. The computing environment 12 may then use the depth values, and captured images to control an application. For example, as shown in FIG. 2A, the computing environment 12 may include a gestures library 190, such as a collection of gesture filters, each having information concerning a gesture that may be performed (as the user moves). For example, a gesture filter can be provided for various hand gestures, such as swiping or flinging of the hands. By comparing a detected motion to each filter, a specified gesture or movement which is performed by a person can be identified. An extent to which the movement is performed can also be determined.

The computing environment may also include a processor 192 for executing instructions which are stored in a memory 194 to provide audio-video output signals to the display device 196 and to achieve other functionality.

FIG. 3 is a flowchart of one embodiment of a process 300 of determining a depth image. Process 300 may be used in a motion capture system 10 such as the example system 10 in FIG. 1. For example, process 300 might be performed by depth camera system 20 or computing environment 12. In step 302, first and second light intensity images of the same scene or field of view are generated. In one embodiment, the first and second light intensity images are generated at the same time, but with different sensors 25. The physical separation between the two sensors 25 may be kept small, such that parallax artifacts may be reduced. In one embodiment, the first and second light intensity images are generated with the same sensor, but at different times. Typically, the time gap between generating the two images is kept small, such that motion artifacts may be reduced. Thus, there may initially be some misalignment of pixels between the two light intensity images. Process 300 may reduce or eliminate this pixel misalignment.

In one embodiment, one of the light intensity images is a gated depth image and the other is an un-gated depth image. Further details of generating gated and un-gated light intensity images are discussed below. Briefly, a gated light intensity image may be one in which the sensor 25 is inactive for some time period and an un-gated depth image is one in which the sensor 25 is active for a longer period than the gated image sensor. The first and second light intensity images are not limited to being gated and un-gated images. In one embodiment, the two light intensity images differ with respect to the phase of a modulated transmission light beam. For example, the two light intensity images may be collected at times that correspond to a 90 degree phase difference in the modulated transmission light beam.

In step 304, boundary values for pixels in the first light intensity image are generated. The boundary values may be an upper value and a lower value that is permitted for each pixel during processing of the first light intensity image. The boundary values may be based on a possible pixel misalignment between the first and second light intensity images. Note that the first image could be either light intensity image. For example, the first light intensity image could be either the gated or the un-gated light intensity image. As one example, boundary values for the gated light intensity image are determined. However, instead, boundary values for the un-gated light intensity image could be determined. An another example, boundary values could be determined for either of the two light intensity images that differ in phase. The values for the first light intensity image may be altered during process 300, as will be discussed below. In one embodiment, the boundary values are based on a value of one or more neighbor pixels. Further details of determining and using the boundary values are discussed below in connection with FIGS. 9 and 10.

In step 306, a depth image is calculated based on the first and second light intensity images. One reason for using two collected light intensity images to form the depth image is that this may compensate for differences in reflectivity of objects in the two collected light intensity images.

As one example, the depth image is determined based on the following approximation in Equation 1

Depth image Gated light intensity Image/Un-gated light intensity Image     Equation 1:

In the above calculation, a pixel-by-pixel division may be performed. For example, the light intensity value of a pixel in the gated light intensity image may be divided by the light intensity value of the corresponding pixel in the un-gated light intensity image, which may result in a depth value. A distance may be determined from the depth value based on various parameters, such as the characteristics of the transmitted light and operation of the sensors. Note that the above equation may be an approximation; the actual equation that is used may be more complex.

In step 308, the depth image from step 306 is smoothed. Smoothing may include, but is not limited to, applying a Gaussian filter or a median filter to the depth image. Thus, smoothing may result in a change to the depth values determined in step 306.

In step 310, a determination is made whether processing of the depth image is complete. If so, the process 300 ends with the smoothed depth image being the final depth image. In one embodiment, step 310 includes comparing the smoothed depth image with the version prior to this smoothing step to determine how much affect smoothing had. If smoothing did not affect the depth image by more than some pre-determined amount, then the process 300 completes. In one embodiment, step 310 also includes determining how many times process 300 has iterated. If process 300 has iterated more than a pre-determined number of times, step 310 may determine that processing of the depth image is complete.

If step 310 determines that processing should continue, then step 312 is performed. In step 312, the first light intensity image is modified based on the smoothed depth image and the second light intensity image. Step 312 may involve performing an inverse of a calculation of step 306 in which the depth image was calculated. As one example, the modification of step 312 may be based on the following approximation in Equation 1:

$$\text{Modified Gated light intensity Image} \approx \text{Smoothed Depth Image} * \text{Un-Gated light intensity Image} \quad \text{Equation 2:}$$

In one embodiment, values for the modified gated light intensity image are not allowed to go outside of the boundary values that were determined in step 304. In one embodiment, values of pixels in the second light intensity image may be adjusted if the corresponding pixel in the first light intensity image would otherwise go outside of the boundary values. Further details are discussed below in connection with FIG. 10.

In step 314, new values for the depth image are determined based on the modified first light intensity image (from step 312) and the second light intensity image. The same equation that was used in step 306 may be used. For example, the following approximation in Equation 3 could be used:

$$\text{Depth image} \approx \text{Modified Gated light intensity Image} / \text{Un-gated light intensity Image} \quad \text{Equation 3:}$$

The process 300 then returns to step 308 to smooth the depth image from step 314. The same smoothing algorithm that was previously used may be used again. However, a different smoothing algorithm could be used. Then, step 310 again determines whether processing the depth image is complete. The process 300 repeats steps 308-314 until step 310 determines that processing is done. At that point, the last depth values for the depth image may be established as final depth values. At this point, aligning the pixels in the two light intensity images may be complete. Note that perfect alignment of pixels in the two light intensity images is not required. That is, some misalignment may be tolerated.

Figure 4A:
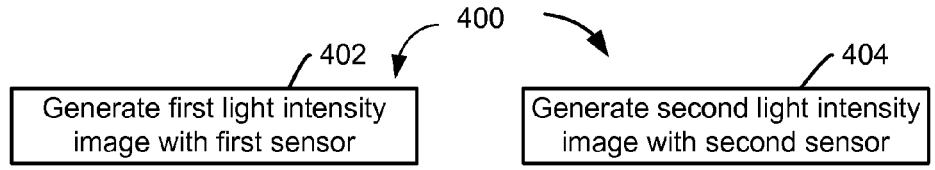
FIG. 4A and FIG. 4B depict flowcharts of embodiments of processes of generating first and second light intensity images.
Figure 4B:
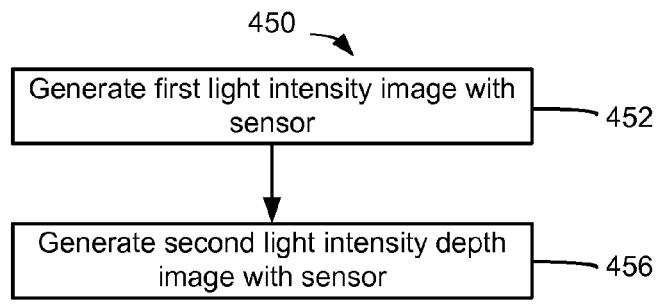

As noted, the first and second light intensity image that are input to process 300 may be generated with two sensors at the same time, or with one sensor at different times. FIGS. 4A and 4B provide two example embodiments of generating first and second light intensity images. FIGS. 4A and 4B depict different embodiments of step 302 of process 300. In steps 402 and 404 of process 400 of FIG. 4A, first and second light intensity images are collected at the same time using different image sensors. In this example, the device has two sensors such as in the embodiments depicted in FIG. 2B or 2C. The difference in physical location of the two sensors may lead to a parallax error. In other words, there could be mismatches between pixels in the first and second light intensity images. A mismatch between the pixels may be explained as follows. Each sensor may be an array of n×m pixels. Ideally, pixel (i, j) of the first light intensity image should represent the same point in the field of view as pixel (i, j) of the second light intensity image. However, because the two sensors may be at different locations, this may not be the case. Note that the original pixel misalignment may be very small. For example, the original pixel misalignment could be less the one pixel: (i+Di, j+Dj), where both Di and Dj are less than 1. However, even small pixel misalignment may negatively impact depth calculations. The iterative process 300 of FIG. 3 may be able to reduce or eliminate the pixel misalignment. Thus, the process 300 may produce a high quality depth image even with these pixel mismatches of input light intensity images.

FIG. 4B depicts one embodiment of a process 450 of generating first and second light intensity images in which a single sensor is used. In step 452, a first light intensity image is collected using a light sensor 25. In step 454, a second light intensity image of the essentially the same scene (or field of view) is collected at a different time using the same sensor 25. In this example, the device has at least one sensor 25 such as in the embodiment of FIG. 2A. As a practical matter, the sensor 25 might be kept in the same physical location between the two readings. However, there could be some motion of objects in the scene between the times the first and second light intensity images are collected. Therefore, these motion artifacts could result in mismatches of pixels between the first and second light intensity images. The iterative process 300 of FIG. 3 may be able to produce a high quality output depth image even with these motion artifacts. The process 300 may be able to reduce or eliminate these motion artifacts, as part of the pixel alignment process.

Figure 5A:
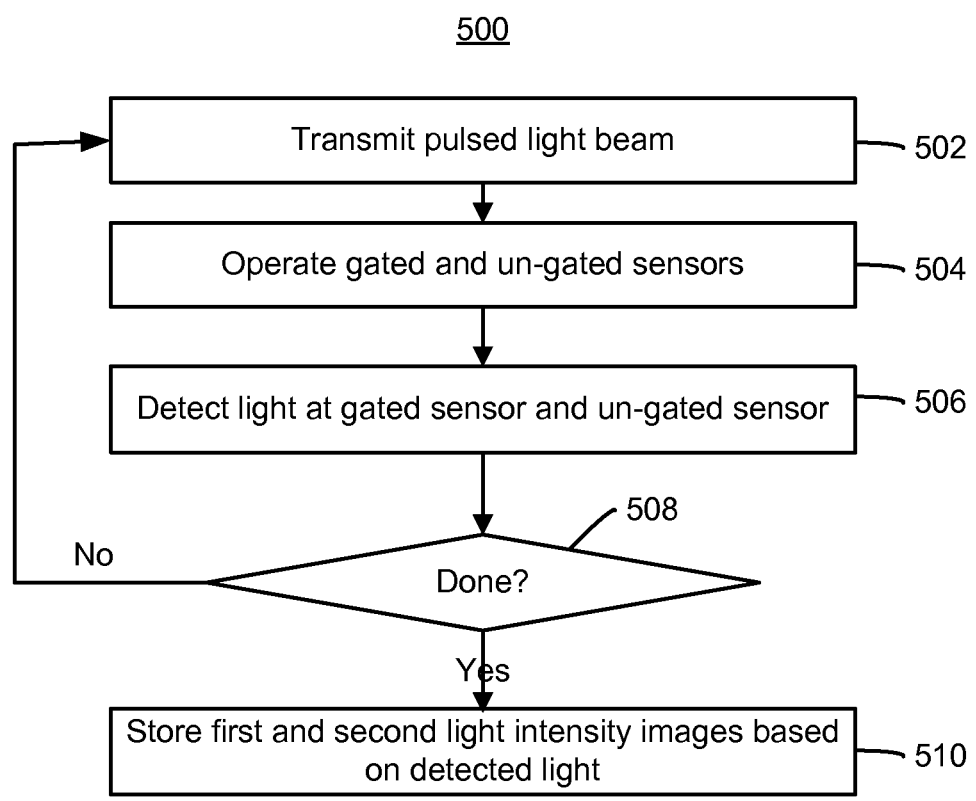
FIG. 5A and FIG. 5B depict flowcharts of embodiments of processes of generating first and second light intensity images based on gated and un-gated sensors.
Figure 5B:
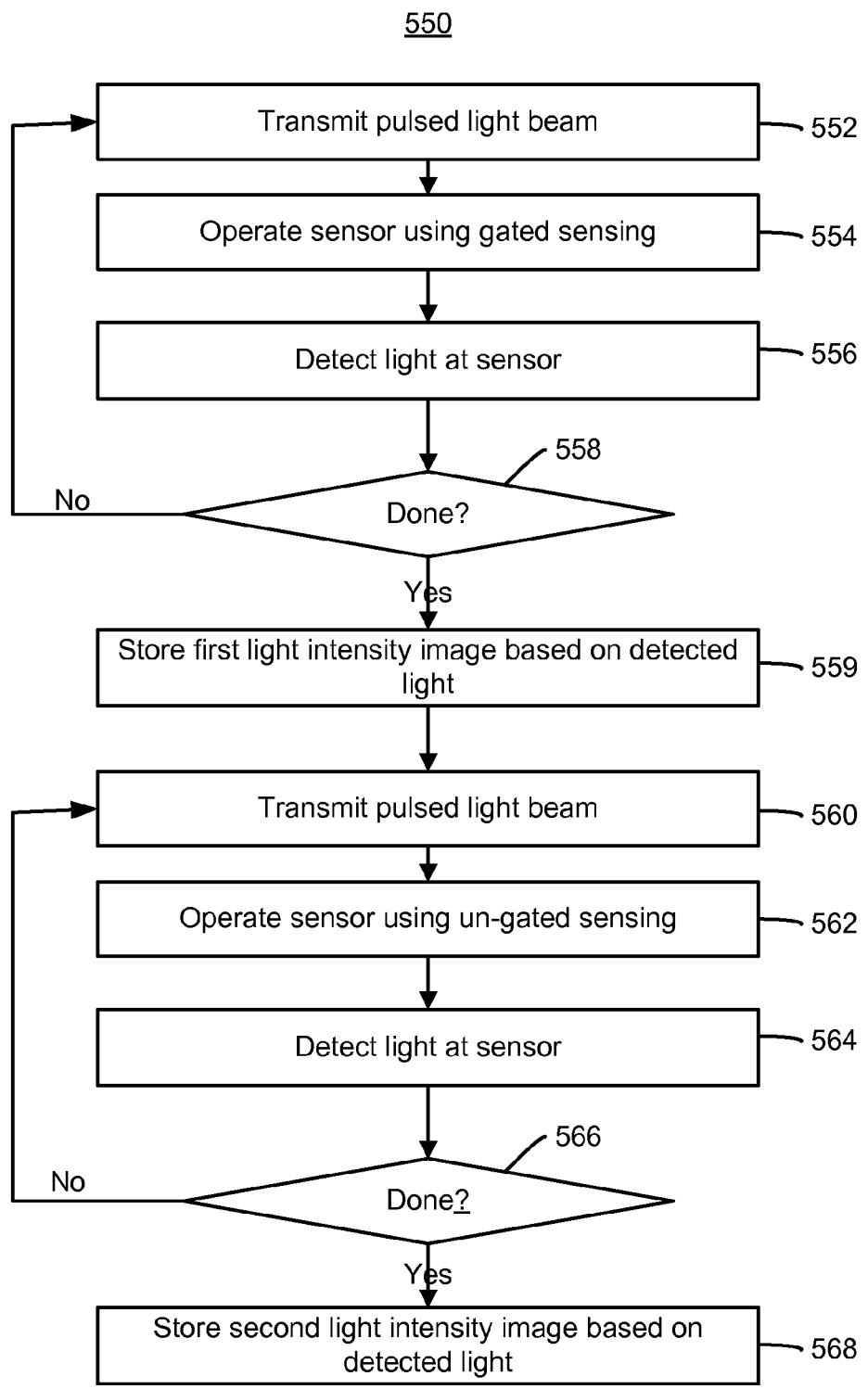

In some embodiments, the first and second light intensity images are generated based on reflections of a pulsed light beam. FIGS. 5A and 5B depicts processes of two such embodiments, which collect light using gated and un-gated sensors. FIGS. 5A and 5B are embodiments of step 302 of process 300. FIG. 5A is also one embodiment of FIG. 4A. FIGS. 6A-6C depict one example of timing of a light pulse, and activation of a gated sensor and an un-gated sensor, which may be used for the process of FIG. 5A.

In step 502, a pulsed light beam is transmitted. In one embodiment, the light beam is infrared (IR). Note that the light beam could be visible light, or another wavelength. FIG. 6A shows an example in which the light beam is pulsed on and off. Note that there may be many pulses during a time in which light is collected at the sensors. For example, there could be hundreds, thousands, or more light pulses during a single collection period. Thus, it will be understood that FIG. 6A has been simplified by only showing two light pulses.

In step 504, a gated sensor and an un-gated sensor are both operated while the light beam is being pulsed. FIG. 6C shows an example in which the un-gated sensor is active for a time period "T" after the light pulse goes from active to inactive. Note that the un-gated sensor could be active prior to when the light pulse goes inactive. The gated sensor (FIG. 6B) is operated for a shorter time period than the un-gated sensor. In this example, the gated sensor is active for about the last half the time period "T". Thus, in this example, the gated sensor is active for a subset of the period in which the un-gated sensor is active. The characteristics of the light pulse (e.g., pulse duration, frequency) and the operation of the sensors may be selected based on a desired range of the image sensor.

In step 506, light is captured at both the gated sensor and the un-gated sensor while they are being operated. As mentioned, there may be many transmitted light pulses during a collection period. The pixels of the gated and un-gated sensors may collect a small amount of light for each light pulse, with the amount of light collected aggregating over time. In some embodiments, the strength or intensity of light that is collected at a given sensor pixel may be used to determine the distance to an object for that pixel. As noted above, one technique for determining a depth value involves dividing the light intensity of the gated sensor by the un-gated sensor.

Process 500 continues until the light collection period is over, as determined by step 508. In one embodiment, the light collection period is a pre-determined number of light pulses. Then, the first and second light intensity images are stored in step 510 based on the light collected by the sensors. As one example, final pixel values from a CCD or CMOS sensor may be stored in memory such that light intensity images are stored.

FIG. 5B depicts a flowchart of one embodiment of a process 550 of generating first and second light intensity images based on a pulsed light beam whose reflection off objects is detected by a single sensor that is gated and later un-gated. Process 550 is one embodiment of step 302 of process 300. Process 550 is also one embodiment of FIG. 4B. In step 552, a pulsed light beam is transmitted. In one embodiment, the light beam is IR. The pulse could be similar to the one used in the process of FIG. 5A. In step 554, a gated sensor is operated while the light beam is being pulsed. In step 556, light is captured at the sensor 25, which is currently being operated as a gated sensor. The process 550 continues until the light collection period is over, as determined by step 558. In one embodiment, the light collection period is a pre-determined number of light pulses. Then, the first light intensity image is stored in step 559 based on the light detected by the sensor.

Next, the light beam is pulsed again in step 560, such that data can be collected with the sensor operated as an un-gated sensor. In step 562, the sensor is operated as an un-gated sensor while the light beam is being pulsed. In step 564, light is collected at the sensor while it is being operated as an un-gated sensor. The process 550 continues until the light collection period is over, as determined by step 566. Then, the second light intensity is stored in step 568 based on the light detected by the sensor in step 564.

As mentioned above, it is not a requirement that the two light intensity images be generated based on gated and un-gated sensing of pulsed light. In one embodiment, the first and second light intensity images are generated by sensing reflections of a modulated light beam off from objects in the field of view. The first and second light intensity images may be generated based on sampling at different points in time, such that there is a 90 degree (or some other amount) of phase shift between the two light intensity images. The phase shift may be in terms of the transmitted light beam.

Figure 5C:
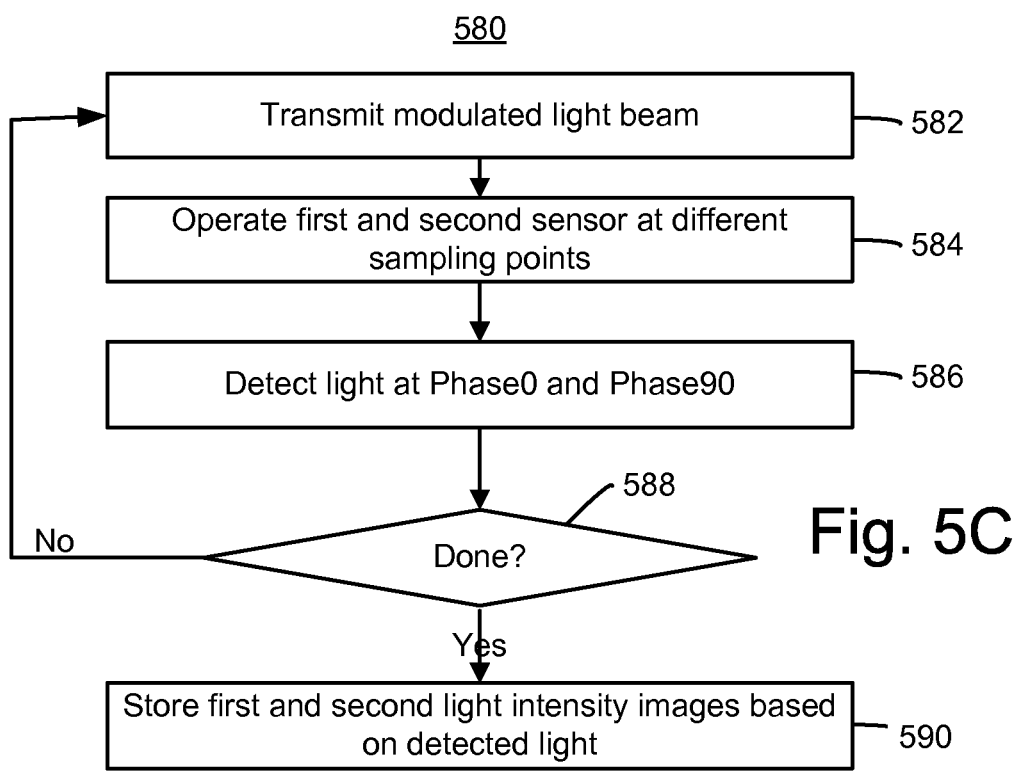
FIG. 5C depicts a flowchart of one embodiment of a process of generating first and second light intensity images having a phase difference between the images.
Figure 13:
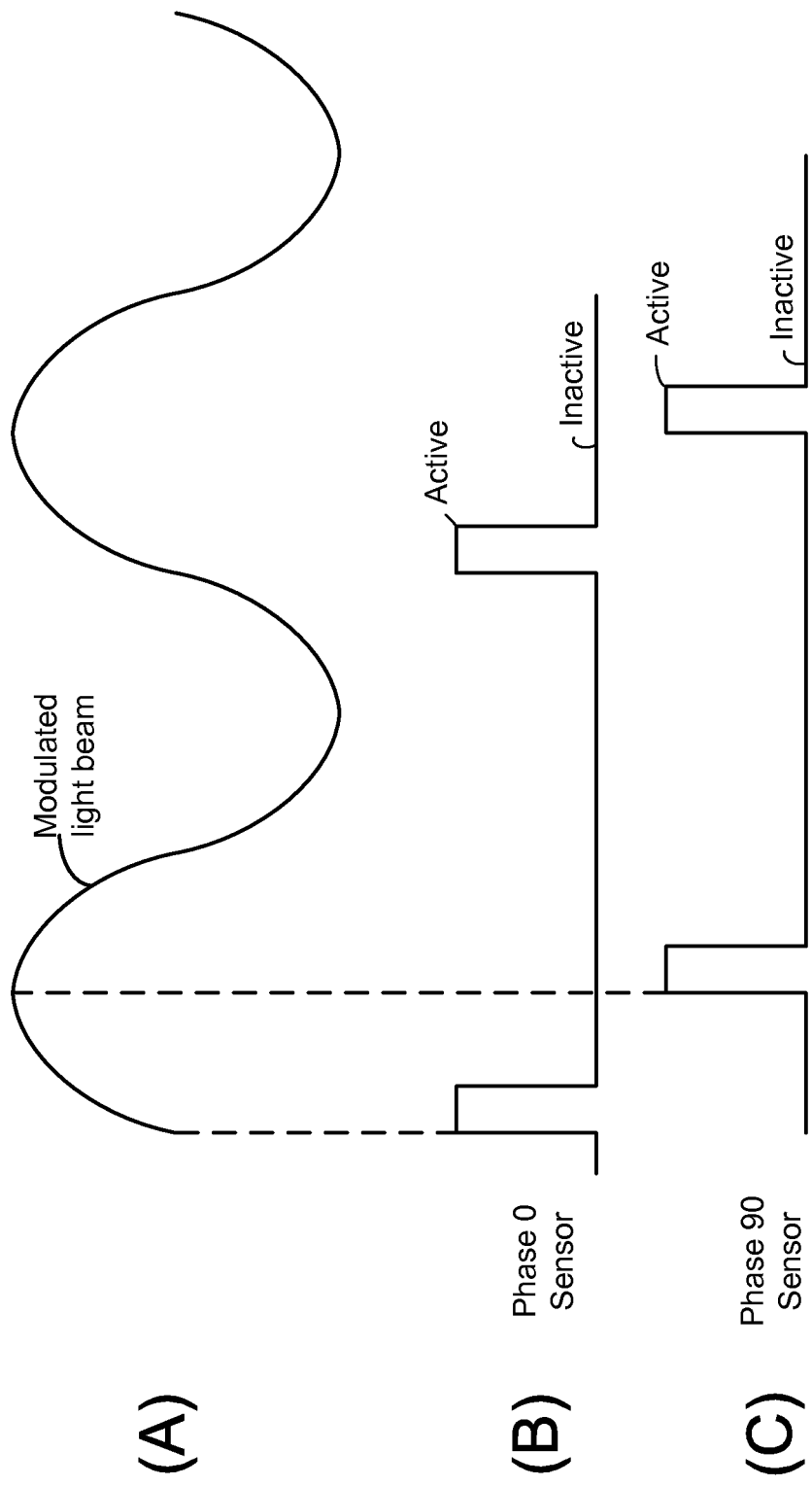
FIGS. 13A, 13B, and 13C depict one example of a modulated light beam, and activation of sensors for an embodiment of FIG. 5C.

FIG. 5C depicts a flowchart of one embodiment of a process 580 of generating first and second light intensity images having a phase difference between the images. Process 580 is one embodiment of step 302 of process 300. Process 580 is also one embodiment of FIG. 4A. In step 582, a modulated light beam is transmitted. For example, an IR beam is modulated using amplitude modulation. FIGS. 13A-13C depict an example waveform of an amplitude modulated light beam and operation of sensors during process 580. Note that only a very small portion of the modulated light beam is depicted.

In step 584, a first and second sensor are operated at 90 degrees phase difference from each other. FIGS. 13B and 13C depict one example of the timing for the first and second sensor. In this example, one sensor is active when the modulated light beam (at its transmittal) is at or near 0 degrees. The width of the active period may be longer or shorter than depicted. The second sensor is active when the modulated light beam (at its transmittal) is at or near 90 degrees. Again, the width of the active period may be longer or shorter than depicted. This collection pattern may repeat with each cycle of the transmitted modulated light beam.

In step 586, light is detected at the first and second sensor. The process 580 continues for the collection period, which may be any desired length of time. After the collection period is over (as determined by step 588), the first and second light intensity images are stored in step 590 based on the detected light. The result is that two light intensity images have been generated based on the data from the two sensors. One light intensity image may be referred to as an ImagePhase0, whereas the other may be referred to as an ImagePhase90. Note that other phase differences may be used.

Figures 7A, 7B:
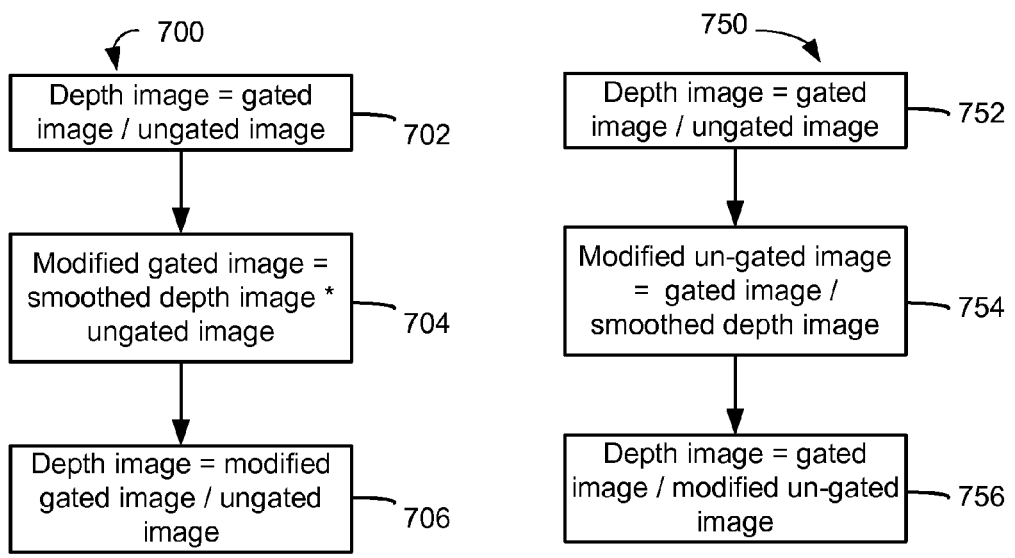
FIGS. 7A and 7B are flowcharts depicting embodiments of processing a depth image based on gated and un-gated sensors.

FIG. 7A is a flowchart depicting one embodiment of a process 700 of processing a depth image. In this embodiment, the input light intensity images are gated and un-gated depth light intensity images. Thus, process 700 could be used with either the process of FIG. 5A or 5B; but is not so limited. Process 700 covers additional details of how processing is performed during process 300 of FIG. 3 when gated and un-gated light intensity images are used. Specifically, process 700 provides additional details for steps 306, 312 and 314 of FIG. 3.

In step 702, the depth image is calculated as the gated light intensity image divided by the un-gated light intensity image. Each light intensity image may have the same number of pixels. For example, there may be 360×240 pixels (or some other number of pixels) in each light intensity image. In one embodiment, step 702 includes dividing the value of each pixel in the gated light intensity image by the value of the corresponding pixel in the un-gated light intensity image. However, other techniques could be used to divide the gated image by the un-gated depth image. Following are several example equations that could be used in step 702.

Step 702 is one embodiment of step 306 of FIG. 3. The output depth image may then be smoothed, as discussed in step 306 of FIG. 3.

$$\text{Depth} = \text{Gated/Ungated} \qquad \text{Equation 4:}$$

$$\text{Depth} = A + B^*(\text{Gated/Ungated}) \qquad \text{Equation 5:}$$

$$\text{Depth} = A^*X^3 + B^*X^2 + C^*X + D, \text{ where } X = \log(G/U) \text{ or } X = G/U \qquad \text{Equation 6:}$$

In the above equations, Depth is the depth values in the depth image, gated is the intensity values of the intensity image collected by the gated sensor, and un-gated is the intensity values of the intensity image collected by the un-gated sensor. The parameters "A" and "B" may be constants that depend on camera settings such as the number of transmitted light pulses and timing of the sensors (e.g., when sensors are active/inactive). The parameter "X" refers to "Gated/Ungated." Note that for the Equations 5 and 6, the depth values may be units of distance, such as centimeters from the camera. For Equation 4, the depth values might be a value in some range (e.g., a value between 0 and 1).

In step 704, a modified gate light intensity image is calculated as the smoothed depth image times the un-gated light intensity image. Step 704 is one embodiment of step 312 of FIG. 3. Step 704 may involve performing a calculation using an inverse of a function used in step 702. For example, if Equation 5 was used in step 702, then Equation 7 might be used in step 704.

$$\text{Gated} = \text{Ungated}^*(\text{depth} - A)/B \qquad \text{Equation 7:}$$

For example, depth values in the depth image have the constant A subtracted from them to perform (depth–A). Multiplying by "ungated" refers to multiplying the intensity value of a pixel in the input ungated light intensity image by a corresponding depth value. Here, a corresponding depth value may be determined based on the depth image and intensity image each being an array of n×m values.

Figure 10:
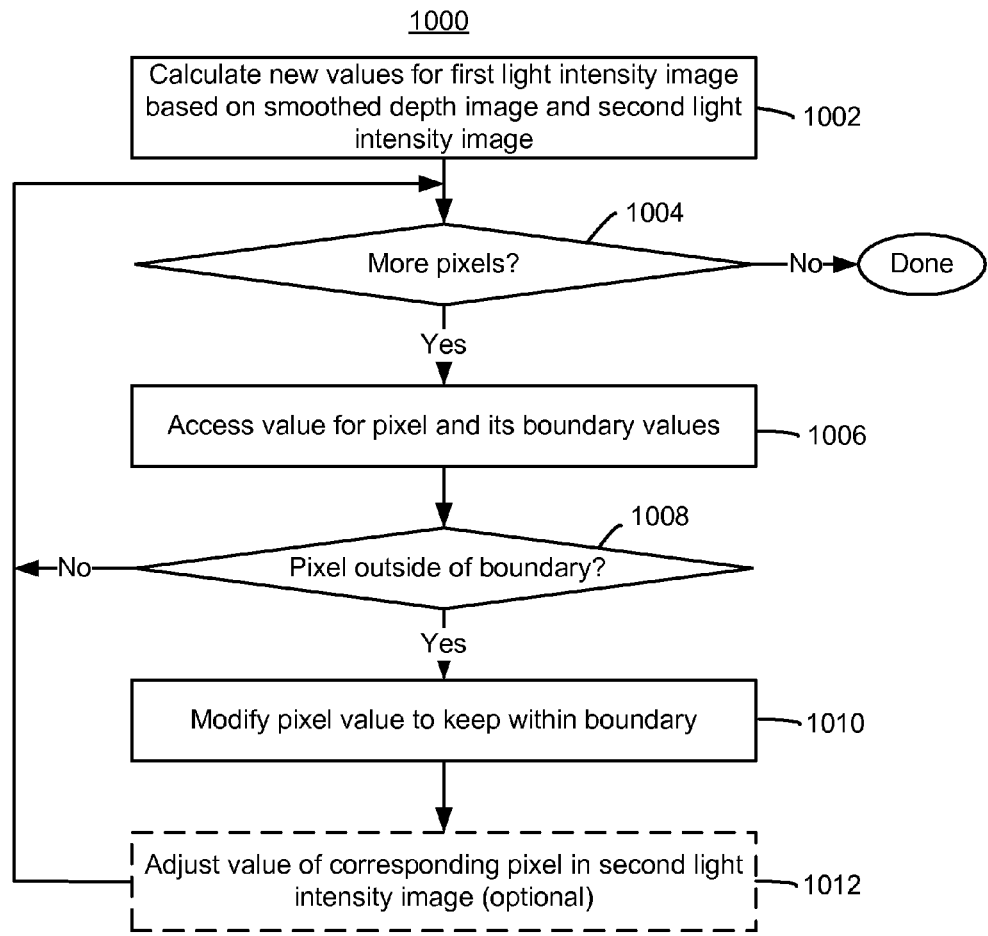
FIG. 10 is a flowchart of one embodiment of a process of using boundary values when determining a depth image.

Note that additional variations of step 704 are possible. FIG. 10 describes one embodiment in which values of the modified gate light intensity image may be kept within boundary values.

In step 706, the depth image is re-calculated as the modified gate light intensity image divided by the (original) ungated light intensity image. Step 706 is one embodiment of step 314 of FIG. 3. Steps 704 and 706 of process 700 may be repeated (see steps 312, 314 of FIG. 3 being repeated).

When a gated and an un-gated light intensity image are processed, the relative roles of the two light intensity images can be reversed. FIG. 7B is a flowchart depicting one embodiment of a process 750 of processing a depth image that is similar to the one of FIG. 7A, but with the roles switched. Process 750 provides additional details for steps 306, 312 and 314 of FIG. 3. In step 702, the depth image is calculated as the gated light intensity image divided by the un-gated light intensity image. This is one embodiment of step 306. The original depth image may then be smoothed, as discussed in step 306 of FIG. 3. Note that this step may be similar to process 700 of FIG. 7A.

In step 754, a modified un-gated light intensity image is calculated as the gated light intensity image divided by the smoothed depth image. Note that step 754 is different from the corresponding step of FIG. 7A (step 704). Step 754 is one embodiment of step 312 of FIG. 3. Note that additional variations of step 754 are possible. FIG. 10 describes one embodiment in which values of the modified un-gate light intensity image may be kept within boundary values for pixels in the un-gated light intensity image.

In step 756, the depth image is re-calculated as the (original) gate light intensity image divided by the modified ungated light intensity image from step 754. Step 756 is one embodiment of step 314 of FIG. 3. Steps 704 and 706 of process 700 may be repeated (see steps 312, 314 of FIG. 3 being repeated).

Figure 8A:
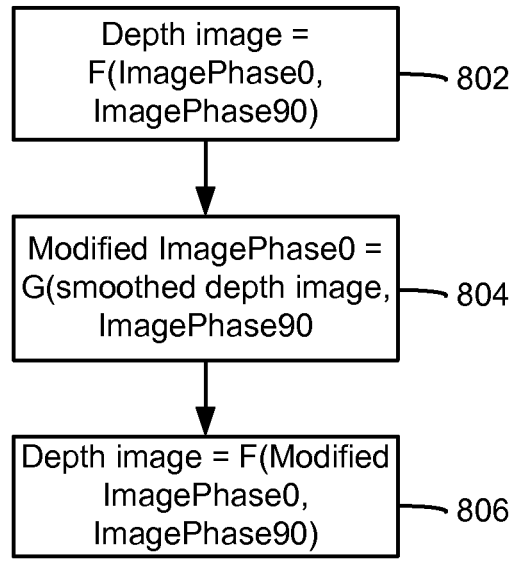
FIGS. 8A and 8B are flowcharts depicting embodiments of processing a depth image based on input images having phase differences.
Figure 8B:
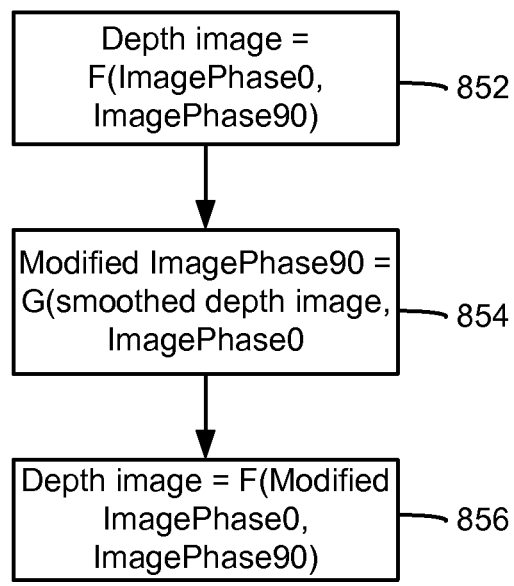

As noted above, the first and second light intensity images could be other than gated and un-gated images. FIGS. 8A and 8B depicts embodiments of processes 800, 850 in which the first and second light intensity images are based on phase differences. One example of generating such depth images was discussed in connection with FIGS. 5C and 6B. For example, the first and second light intensity images are generated by collected data at 90 degree phase difference between them. For purposes of discussion, these light intensity images will be referred to as ImagePhase0 and ImagePhase90. However, it will be noted that other phase differences could be used. A difference between the process of FIGS. 8A and 8B is which collected light intensity image gets modified during the process. Note that FIGS. 8A and 8B are similar to FIGS. 7A and 7B in that they provide additional details of steps 306, 312 and 314 of FIG. 3.

In step 802 of FIG. 8A, the depth image is calculated as a function of ImagePhase0 and ImagePhase90. A general form may be as follows in Equation 7:

$$\text{depth image} \approx A^{*}\text{atan 2(ImagePhase0, ImagePhase90)} + B \qquad \text{Equation 8:}$$

That is to say, the depth image may be a function of the arctangent of the two light intensity images. Step 802 is one embodiment of step 306. The original depth image may then be smoothed, as discussed in step 306 of FIG. 3.

In step 804, a modified ImagePhase0 is calculated based on the smoothed depth image and ImagePhase90. In some embodiments, a function used in step 804 is an inverse of the function used on step 802. Step 804 is one embodiment of step 312 of FIG. 3. Note that additional variations of step 804 are possible. FIG. 10 describes one embodiment in which values of the modified ImagePhase0 image may be kept within boundary values for pixels in the ImagePhase0 depth image.

In step 806, the depth image is re-calculated as the modified ImagePhase0 and the (original) ImagePhase90. Step 806 may involve using the same or a similar equation as in step 802. Step 806 is one embodiment of step 314 of FIG. 3. Steps 804 and 806 of process 800 may be repeated (see steps 312, 314 of FIG. 3 being repeated).

In the embodiment of FIG. 8A, the ImagePhase0 light intensity image was modified in step 804. In another embodiment, the ImagePhase90 depth image is modified in a similar manner. FIG. 8B is a flowchart depicting one embodiment of a process 850 of processing a depth image. Process 850 provides additional details for steps 306, 312 and 314 of FIG. 3. In step 852, the original depth image is calculated as a function of ImagePhase0 and ImagePhase90. This is one embodiment of step 306. The original depth image may then be smoothed, as discussed in step 306 of FIG. 3. Note that this step may be similar to step 802 of FIG. 8A.

In step 854, a modified ImagePhase90 is calculated based on the smoothed depth image and ImagePhase0. In some embodiments, a function used in step 854 is an inverse of the function used on step 802. For example, if an arctangent function is used in step 802, then a tangent function may be used in step 854. Step 804 is one embodiment of step 312 of FIG. 3.

In step 856, the depth image is re-calculated as the modified ImagePhase90 and the (original) ImagePhase0. Step 856 may involve using the same or a similar equation as in step 802. Step 856 is one embodiment of step 314 of FIG. 3. Steps 854 and 856 of process 850 may be repeated (see steps 312, 314 of FIG. 3 being repeated). This concludes discussion of FIG. 8B.

Figure 9:
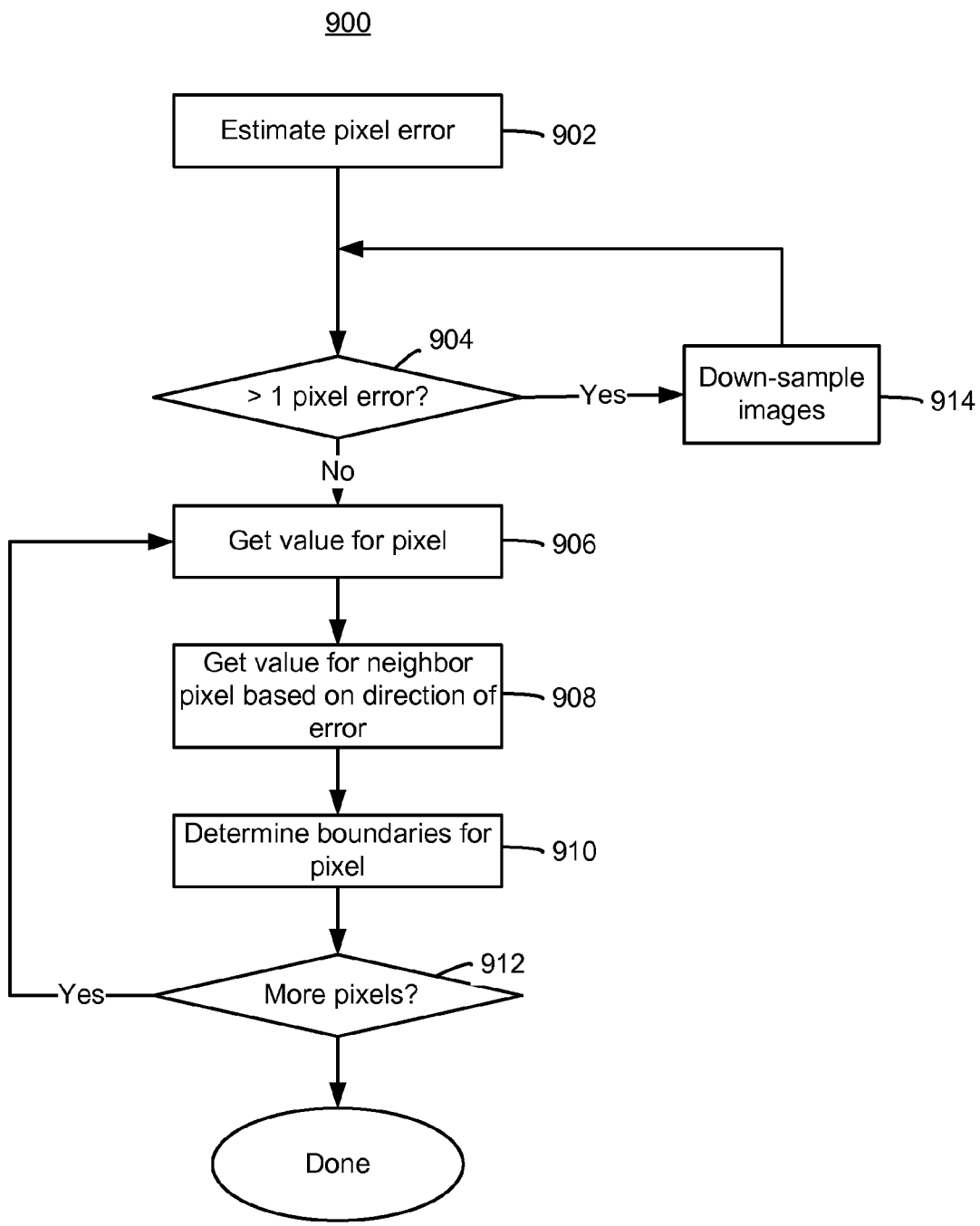
FIG. 9 is a flowchart of one embodiment of a process of determining boundary values when determining a depth image.

In some embodiments, boundary values are determined for pixels in the first light intensity image (which is modified in process 300). The pixel values may be kept within the boundary values while modifying the first light intensity image. FIG. 9 is a flowchart of one embodiment of a process 900 of determining boundary values when processing the first light intensity image. Process 900 provides further details for step 304 of FIG. 3.

One factor that may affect processing the light intensity images is the expected amount of pixel error between the first and second light intensity images. The pixel error refers to the fact there could be some pixel misalignment due to the light intensity images being collected from sensors at different physical locations or, alternatively, from the same sensor but at different times. In step 902 a pixel error is estimated. For light intensity images that are collected at the same time using two different sensors, the expected amount of error can be determined based, at least in part, on the physical location of the two sensors. The expected error may also be based on other factors such as the range and angular field of view of the depth camera system 10, as well as characteristics of the sensors 25 (e.g., number of pixels). For example, referred to FIG. 2C, depth sensors 25a and 25b are at a known location to the left and right of the light transmitted 24. For the sake of example, sensor 25c may be used to collect the first light intensity image and sensor 25d may be used to collect the second light intensity image. In this case, there may be an expected translation error of less than one pixel in a certain direction (e.g., to the left or right). Due to the geometry, it may be possible to confine the expected error in one direction. For a sensor configuration such as depicted in FIG. 2B, the expected error might be in a different direction than the example of FIG. 2C. Note that in some cases, the expected error might be more than one pixel.

In step 904, a determination is made whether the expected pixel error (or misalignment) is less than one pixel. If so, processing of the pixels in the first light intensity image is performed in step 906-912. Note that the first light intensity image could be either of the two collected light intensity images. For example, it could be the gated or the un-gated light intensity image. Alternatively, it could the ImagePhase0 or ImagePhase90 light intensity images. In step 906, the value for a first pixel in the first light intensity depth image is accessed.

In step 908, a value for the first pixel's neighbor is accessed. The neighbor may be selected based on the expected direction of pixel misalignment. As an example, for the configuration of FIG. 2C, the neighbor to either the right or to the left may be selected.

In step 910, boundary values are determined for the first pixel based on the value of the first pixel and the value of the neighbor. In one embodiment, this involves setting a lower boundary value as the lower of the two pixel values and higher boundary value as the higher of the two pixel values. In effect, this establishes boundaries for the first pixel between the value of the first pixel and the selected neighbor. This may involve assuming a linear interpolation between the first pixel and its selected neighbor, which is not a requirement. In other words, a boundary value could extend somewhat below the lower or above the higher of the two pixel values.

In step 912, a determination is made as to whether there are more pixels to process in the first light intensity image. If so, processing repeats steps 906-910 for the next pixel. Once boundary values have been established for all pixels in the first light intensity image, processing completes.

As noted, in some cases the expected pixel error (or misalignment) might be greater than one pixel. In this event, step 914 may be performed (after step 904). Step 914 is to down-sample the first light intensity image. Note that the second image may also be down-sampled for later processing. Down-sampling (also referred to as re-sampling) an image may involve reducing the number of pixels in the light intensity image. For example, a 360×120 pixel image could be down-sampled to a 180×60 pixel image. Down-sampling images is well understood in the art and will not be described in detail.

Down-sampling the light intensity image may reduce the error (misalignment) pixels in the first and second light intensity images. Therefore, after down-sampling, a re-determination is made as to whether there is less than a one pixel error between the first and second light intensity image, in step 904. Similar techniques may be used as were previously used and described above. If the down-sampling achieved a misalignment of less than one pixel, then processing may continue as previously described in step 906-912. Otherwise, the first light intensity image (and possibly second light intensity image) may be further down-sampled in step 904.

FIG. 10 is a flowchart of one embodiment of a process 1000 of using boundary values when processing the first light intensity image. Process 1000 provides further details for step 312 of FIG. 3. Process 1000 also discusses possible modification of the second light intensity image when a pixel of the first image would otherwise go outside of its boundary value.

In step 1002, new values are determined for the first light intensity image based on the smoothed depth image and the second light intensity image. As one example, pixels in the smoothed depth image are multiplied by corresponding pixels in the un-gated light intensity image. Note that this may be considered to be an inverse of calculating the depth image as the gated light intensity image divided by the un-gated light intensity image.

The result of step 1002 could be that some of the pixels in the first light intensity image (e.g., gated image) are outside of the boundary values. In step 1004, a determination is made whether there are more pixels in the (modified) first light intensity image to check for boundary violations. If not, then the process 1000 concludes. Otherwise, the value for the next pixel and its boundary values are accessed in step 1004. These boundary values may have been determined by process 900 of FIG. 9.

In step 1008, a determination is made as to whether a first pixel in the (modified) first light intensity image is outside of its boundary values. If not, then the process returns to step 1004 to determine whether there are more pixels in the first light intensity image to be examined for compliance with boundary values.

If the first pixel is outside of its boundary values, then the pixel value is adjusted such that it stays within the boundaries, in step 1010. Further, as an optional step, the value of the corresponding pixel in the second light intensity image may be adjusted in step 1012. For example, if the pixels are eight bit values, the value could be incremented (or decremented) by one. Of course, pixels may be other than eight bit values. Moreover, the value could be modified by more than one. Whether the value is incremented or decremented may depend on whether the value of the pixel in the first light intensity image was above or below the boundaries. After step 1012, the process 1000 returns to step 1004 to determine whether there are more pixels to determine for compliance with the boundary values.

Figure 11:
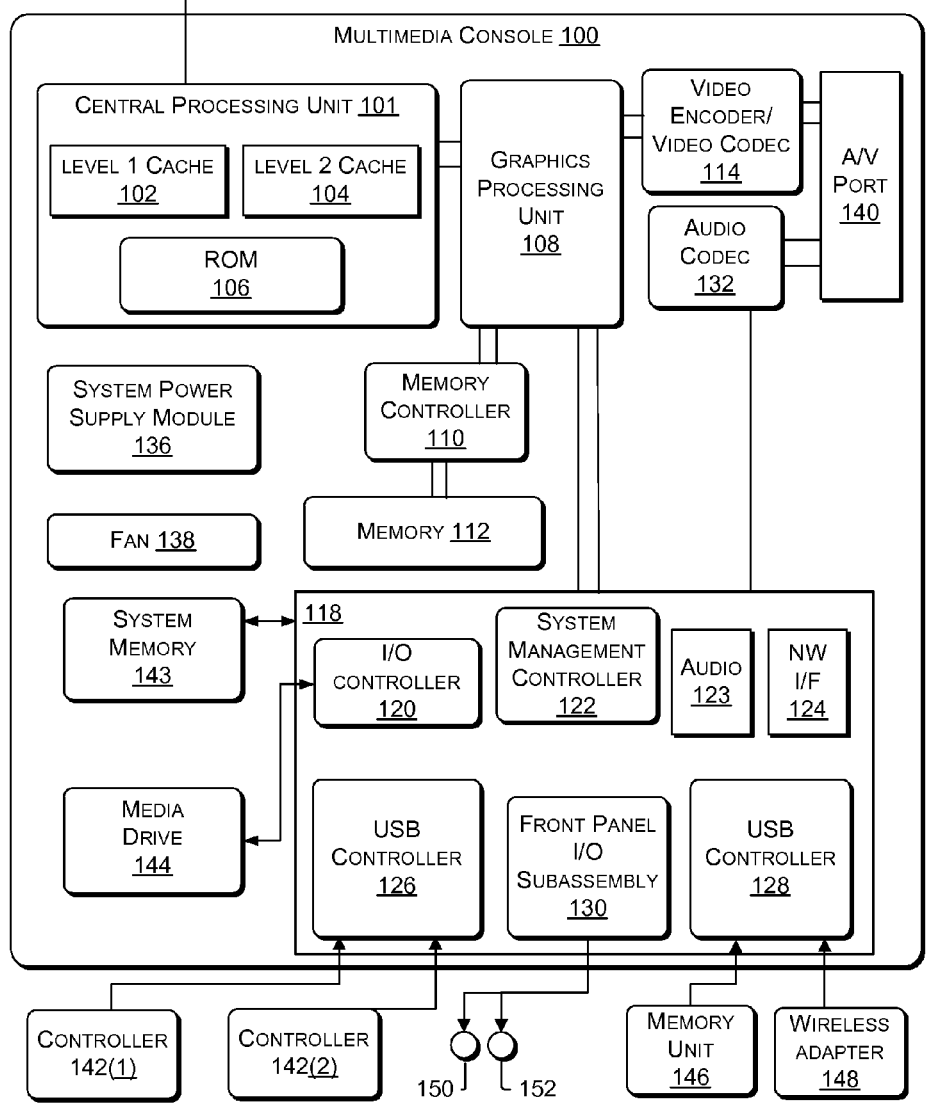
FIG. 11 depicts an example block diagram of a computing environment that may be used in the motion capture system of FIG. 1.

FIG. 11 depicts an example block diagram of a computing environment that may be used in the motion capture system of FIG. 1. The depth camera system 20 may provide input to the console 100. In one embodiment, the depth camera system 20 determines depth values and provides them to the console 100. In one embodiment, the depth camera system 20 collects image data (e.g., light intensity images), which it provides to the console to determine the depth image.

The computing environment such as the computing environment 12 described above may include a multimedia console 100, such as a gaming console. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The memory 106 such as flash ROM may store executable code that is loaded during an initial phase of a boot process when the multimedia console 100 is powered on.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as RAM (Random Access Memory).

The multimedia console 100 includes an I/O controller 120, a system management controller 122, an audio processing unit 123, a network interface 124, a first USB host controller 126, a second USB controller 128 and a front panel I/O subassembly 130 that may be implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface (NW IF) 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection.

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered on, a specified amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation may be large enough to contain the launch kernel, concurrent system applications and drivers. The CPU reservation is may be constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay may depend on the overlay area size and the overlay may scale with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications may be scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager may control the switching of input stream, without knowledge the gaming application's knowledge and a driver maintains state information regarding focus switches. The console 100 may receive additional inputs from the depth camera system 20 of FIG. 2, including the camera 28.

Figure 12:
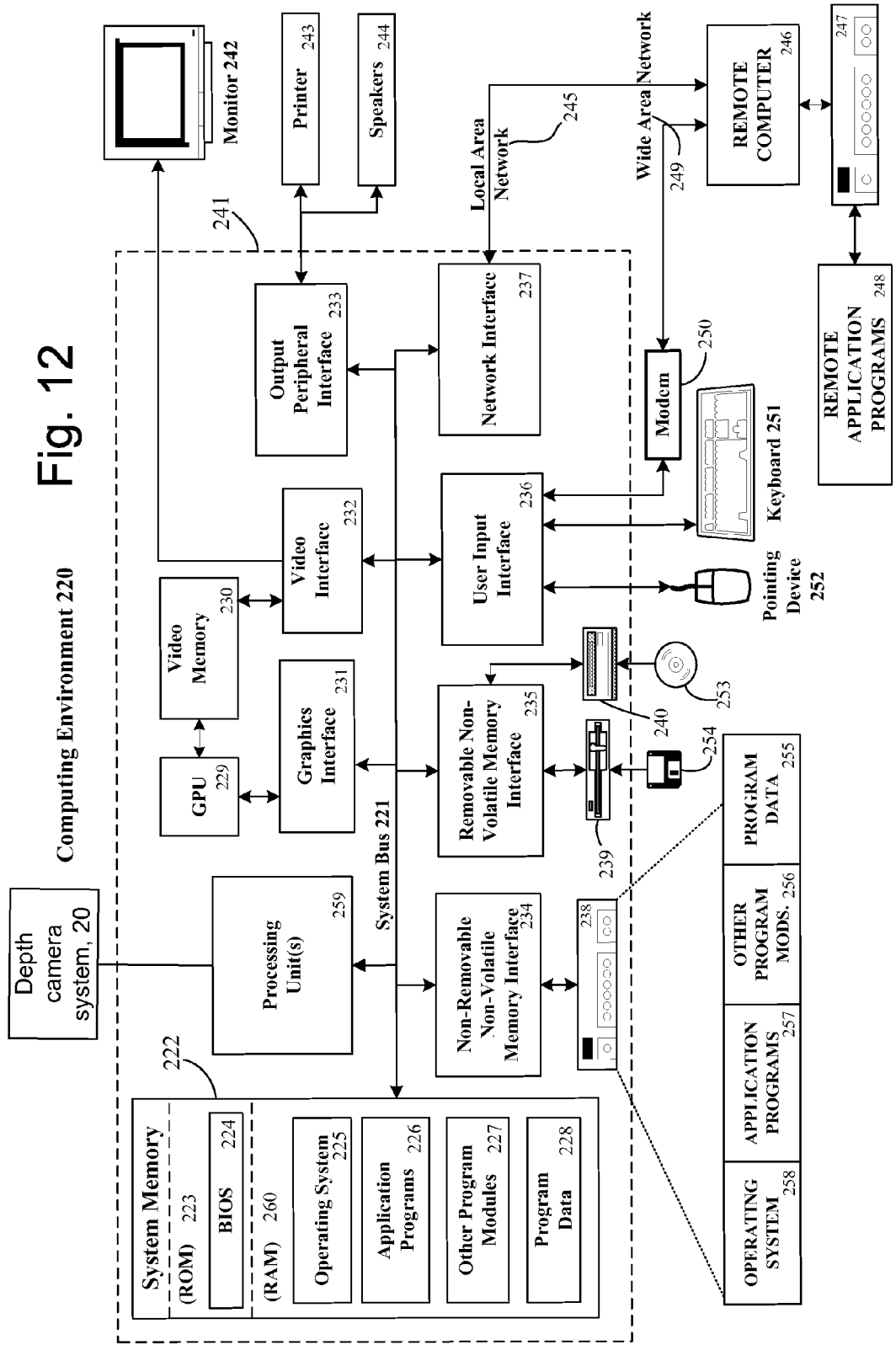
FIG. 12 depicts another example block diagram of a computing environment that may be used in the motion capture system of FIG. 1.

FIG. 12 depicts another example block diagram of a computing environment that may be used to determine depth images. In one embodiment, the depth camera system 20 provides image data (such as two light intensity images) to the computing environment to determine the depth image. In one embodiment, the depth camera system 20 provides the depth values for use by the computing environment 220.

The computing environment 220 comprises a computer 241, which typically includes a variety of tangible computer readable storage media. This can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. A graphics interface 231 communicates with a GPU 229. By way of example, and not limitation, FIG. 12 depicts operating system 225, application programs 226, other program modules 227, and program data 228.

The computer 241 may also include other removable/non-removable, volatile/nonvolatile computer storage media, e.g., a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile tangible computer readable storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and depicted in FIG. 12, provide storage of computer readable instructions, data structures, program modules and other data for the computer 241. For example, hard disk drive 238 is depicted as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to depict that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The depth camera system 20 of FIG. 2, including camera 28, may define additional input devices for the console 100. A monitor 242 or other type of display is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been depicted in FIG. 12. The logical connections include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 12 depicts remote application programs 248 as residing on memory device 247. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method, comprising:
calculating, by a depth camera system, a depth image based on a first light intensity image and a second light intensity image, the first and second light intensity images contain pixel values for the same scene;
smoothing the depth image by the depth camera system;
modifying the first light intensity image by the depth camera system;
calculating new values for the depth image based on the modified first light intensity image and the second light intensity image by the depth camera system;
repeating, by the depth camera system, the smoothing the depth image, the modifying the first light intensity image, and the calculating new values for the depth image until it is determined that processing the depth image is complete.

2. The method of claim 1, wherein the modifying the first light intensity image includes modifying the first light intensity image based on either the smoothed depth image or the second light intensity image.

3. The method of claim 1, wherein the modifying the first light intensity image includes modifying the first light intensity image based on the smoothed depth image.

4. The method of claim 1, wherein the modifying the first light intensity image includes modifying the first light intensity image based on the second light intensity image.

5. The method of claim 1, wherein the modifying the first light intensity image includes keeping pixel values of the first light intensity image within boundary values for pixels in the first light intensity image.

6. The method of claim 5, further comprising determining, by the depth camera system, the boundary values for pixels in the first light intensity image based on one or more neighbor pixels in the first light intensity image.

7. The method of claim 1, wherein the calculating a depth image includes using a mathematical function, the modifying the first light intensity image includes using an inverse of the mathematical function.

8. The method of claim 1, wherein the modifying the first light intensity image includes performing an inverse of the calculation to determine the depth image.

9. An apparatus, comprising:
a processor configured to access a first light intensity image and a second light intensity image, the first and second light intensity images contain pixel values for the same scene, calculate a depth image based on the first light intensity image and the second light intensity image, smooth the depth image, modify the first light intensity image, calculate new values for the depth image based on the modified first light intensity image and the second light intensity image, repeat the smoothing the depth image, the modifying the first light intensity image, and the calculating new values for the depth image until it is determined that processing the depth image is complete.

10. The apparatus of claim 9, wherein the processor configured to modify the first light intensity image includes the processor configured to modify the first light intensity image based on either the smoothed depth image or the second light intensity image.

11. The apparatus of claim 9, wherein the processor configured to modify the first light intensity image includes the processor configured to modify the first light intensity image based on the smoothed depth image.

12. The apparatus of claim 9, wherein the processor configured to calculate a depth image includes the processor applying a mathematical function, the processor configured to modify the first light intensity image includes the processor applying an inverse of the mathematical function.

13. The apparatus of claim 9, wherein the processor is configured to determine boundary values based on possible pixel misalignment between the first and second light intensity images, wherein the processor configured to modify the first light intensity image includes the processor configured to keep pixel values in the first light intensity image within the boundary values.

14. The apparatus of claim 13, further comprising:
a first sensor; and
a second sensor, wherein the processor being configured to determine boundary values include the processor being configured to determine an upper boundary value and a lower boundary value for a first pixel in the first light intensity image based on the value of the first pixel in the first light intensity image and the value of one or more neighbors to the first pixel, wherein the one or more neighbors are determined based on geometry of the first sensor and the second sensor.

15. The apparatus of claim 9, further comprising:
a first sensor, the processor is configured to determine the first light intensity image by gating the first sensor; and
a second sensor, the processor is configured to determine the second light intensity image without gating the second sensor.

16. A computer readable storage medium having instructions stored thereon which, when executed by a processor, cause the processor to:
calculate a depth image based on a first light intensity image and a second light intensity image, the first and second light intensity images contain pixel values for the same scene;
smooth the depth image;
modify the first light intensity image after smoothing the depth image;
calculate new values for the depth image based on the modified first light intensity image and the second light intensity image;
repeat the smoothing the depth image, the modifying the first light intensity image, and the calculating new values for the depth image until it is determined that processing the depth image is complete.

17. The computer readable storage medium of claim 16, wherein the instructions which cause the processor to modify the first light intensity image include instructions which cause the processor to modify the first light intensity image based on either the smoothed depth image or the second light intensity image.

18. The computer readable storage medium of claim 16, wherein the instructions which cause the processor to modify the first light intensity image include instructions which cause the processor to modify the first light intensity image based on the smoothed depth image.

19. The computer readable storage medium of claim 16, further comprising instructions which when executed on the processor cause the processor to determine boundary values for pixels in the first light intensity image based on a possible pixel misalignment between the first light intensity image and the second light intensity image, the instructions which cause the processor to modify the first light intensity image include instructions which when executed on the processor cause the processor to keep pixel values in the first light intensity image within the boundary values.

20. The computer readable storage medium of claim 16, wherein the instructions which cause the processor to calculate a depth image include instructions which when executed on the processor cause the processor to apply a mathematical function to the first light intensity image and the second light intensity image, the instructions which cause the processor to modify the first light intensity image include instructions which when executed on the processor cause the processor to apply an inverse of the mathematical function to one or more of the smoothed depth image or the second light intensity image.

* * * * *